US008317090B2

(12) United States Patent
Wiesman et al.

(10) Patent No.: US 8,317,090 B2
(45) Date of Patent: Nov. 27, 2012

(54) METHODS AND SYSTEMS FOR PERFORMING A FINANCIAL TRANSACTION

(75) Inventors: Mark Wiesman, Chesterfield, MO (US); Bruce Rutherford, Stamford, CT (US); Art Kranzley, Pound Ridge, NY (US); Stephen Orfei, Katonah, NY (US)

(73) Assignee: MasterCard International Incorporated, Purchase, NY (US)

( * ) Notice: Subject to any disclaimer, the term of this patent is extended or adjusted under 35 U.S.C. 154(b) by 96 days.

(21) Appl. No.: 12/748,119

(22) Filed: Mar. 26, 2010

(65) Prior Publication Data

US 2010/0243728 A1 Sep. 30, 2010

Related U.S. Application Data

(60) Provisional application No. 61/164,240, filed on Mar. 27, 2009.

(51) Int. Cl.
*G06F 19/00* (2006.01)
(52) U.S. Cl. ......................................... 235/379; 235/380
(58) Field of Classification Search .................. 235/379, 235/380, 382, 383, 487, 492
See application file for complete search history.

(56) References Cited

U.S. PATENT DOCUMENTS

| | | | | |
|---|---|---|---|---|
| 5,559,887 | A | * | 9/1996 | Davis et al. .................. 705/68 |
| 5,793,028 | A | | 8/1998 | Wagener et al. |
| 6,029,151 | A | * | 2/2000 | Nikander ..................... 705/39 |
| 6,227,447 | B1 | * | 5/2001 | Campisano ................ 235/380 |
| 6,915,279 | B2 | | 7/2005 | Hogan et al. |
| 7,058,611 | B2 | | 6/2006 | Kranzley et al. |
| 7,080,048 | B1 | * | 7/2006 | Sines et al. ................... 705/75 |
| 7,379,919 | B2 | | 5/2008 | Hogan et al. |
| 2003/0126094 | A1 | | 7/2003 | Fisher et al. |
| 2005/0246278 | A1 | | 11/2005 | Gerber et al. |
| 2007/0143227 | A1 | | 6/2007 | Kranzley et al. |
| 2007/0150352 | A1 | | 6/2007 | Kelly-Frank et al. |
| 2007/0262139 | A1 | | 11/2007 | Fiebiger et al. |
| 2008/0071682 | A1 | | 3/2008 | Dominguez |
| 2009/0119205 | A1 | | 5/2009 | Keresman, III et al. |
| 2009/0157528 | A1 | * | 6/2009 | Hobson et al. .................. 705/26 |
| 2009/0164477 | A1 | | 6/2009 | Ganguly |
| 2009/0325542 | A1 | | 12/2009 | Wentker et al. |
| 2010/0228624 | A1 | * | 9/2010 | Morris et al. .............. 705/14.47 |

OTHER PUBLICATIONS

PCT/US2010/028928; International Search Report and the Written Opinion of the International Searching Authority dated May 20, 2010 (12 pages).
http://usa.visa.com/merchants/payment_technologies/tech_vendors_vbv_how.html; "Verified by Visa—How It Works"; copyright 1996-2010 Visa; 2 pages.
International Search Report and Written Opinion dated Nov. 16, 2011, PCT/US2011/042361 (12 pages).

* cited by examiner

*Primary Examiner* — Daniel St. Cyr
(74) *Attorney, Agent, or Firm* — Armstrong Teasdale LLP

(57) ABSTRACT

A system and computer-based method for performing a financial transaction using an interchange computer coupled to a database, the interchange computer and database associated with an interchange network, the transaction initiated by a cardholder with a merchant. The method includes receiving, at the interchange computer, a payer authentication request message from the merchant, the payer authentication request message associated with the cardholder and including data representing at least one of transaction card brands supported for payment, a response time limit, and item purchase information. The cardholder is prompted to enter access credential information. The entered access credential information is verified at the interchange computer. The cardholder is prompted to select a transaction card from one or more transaction cards associated with the cardholder. A payer authentication response message including transaction card data associated with the selected transaction card is transmitted from the interchange computer to the merchant.

23 Claims, 7 Drawing Sheets

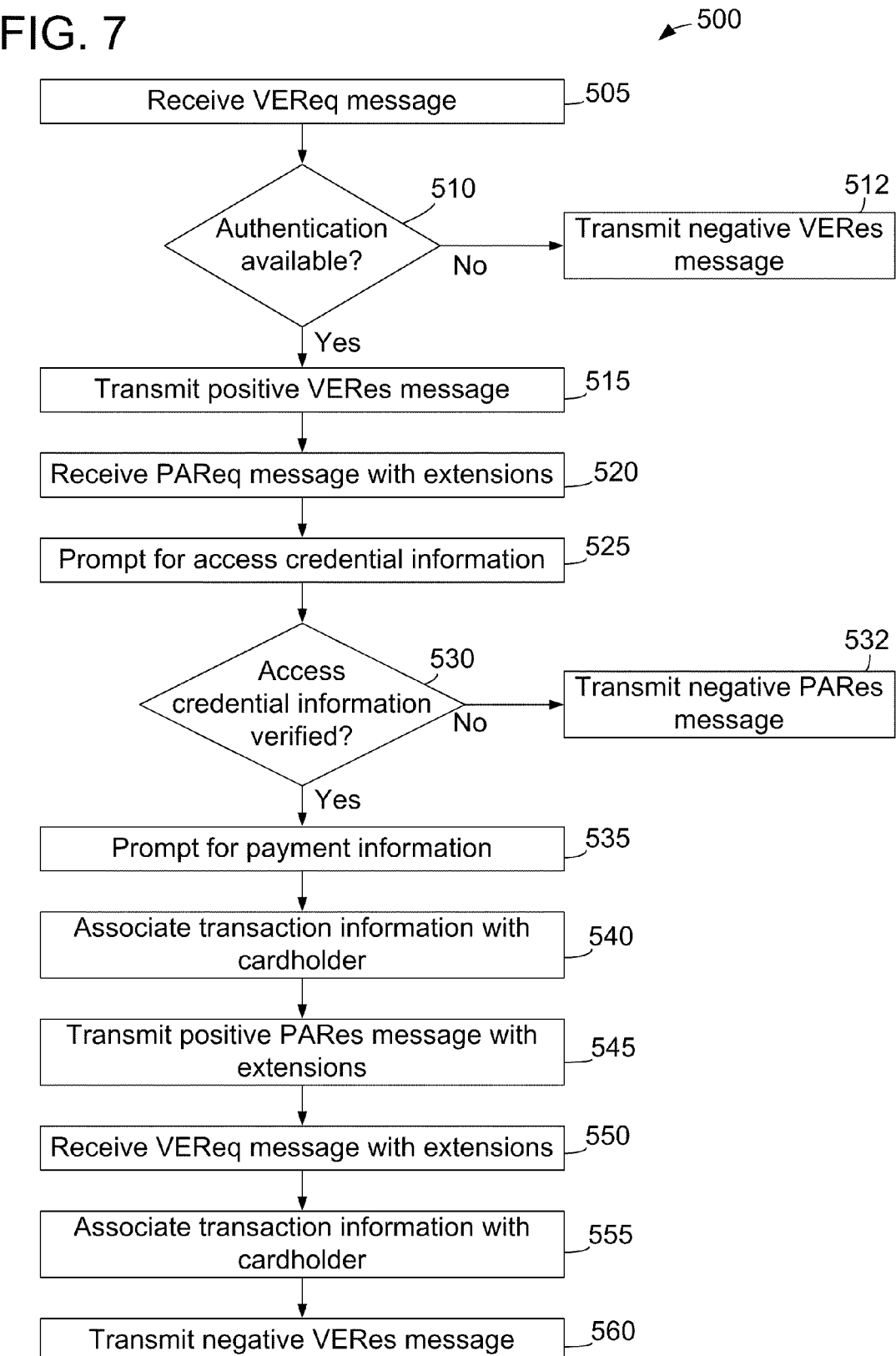

METHODS AND SYSTEMS FOR PERFORMING A FINANCIAL TRANSACTION

CROSS-REFERENCE TO RELATED APPLICATIONS

This application claims the priority of U.S. Provisional Patent Application Ser. No. 61/164,240, filed Mar. 27, 2009, which is incorporated herein by reference.

BACKGROUND OF THE INVENTION

This invention relates generally to systems and methods for using protocol extensions to perform a financial transaction and, more particularly, to network-based systems and methods for using protocol extensions to communicate data between computer devices when performing a financial transaction initiated by a cardholder using a transaction card with a merchant.

Financial transaction cards are widely used in the United States and elsewhere as a means to attract financial accounts to financial institutions and, in the case of credit cards, as a medium to create small loans and generate interest income for financial institutions.

The financial transaction card industry is subject to certain well-known problems. For example, in the credit card industry it is well-known that at least some persons will engage in fraudulent activities through either the theft of a credit card or a credit card number. The utilization of financial transaction cards in online transactions exacerbates the risk of fraudulent activity. Financial transaction card companies have thus implemented increased security measures to reduce the instances of such fraudulent activity. These increased security measures utilize a standardized protocol for communicating transaction information between computer devices, and require a user to provide authentication credentials (e.g., a username and/or password) in addition to their credit card number to complete a transaction with a merchant.

In addition to providing certain information to satisfy the security measures implemented by merchants, issuing banks or other parties involved in the online purchasing process, cardholders must also manually provide other information to the merchant to complete the transaction. This information can include, for example, billing and/or shipping addresses, or the name, birth date, phone number, email address or other information concerning the cardholder. This information is typically received when the cardholder manually enters the information into a computer system/input device. The process of manually entering this information can be time-consuming and tedious for the cardholder. Furthermore, the user-entered information may contain errors (e.g., typographical errors) since it is manually provided by the user.

Accordingly, a system and method is needed that utilizes known protocols for communicating information between computer devices to exchange transaction data between the computer devices in order to enhance and further automate the transaction process.

BRIEF SUMMARY OF THE INVENTION

In one aspect, a method is provided for performing a financial transaction using an interchange computer coupled to a database. The interchange computer and database are associated with an interchange network, and the transaction is initiated by a cardholder with a merchant. The method includes receiving, at the interchange computer, a payer authentication request message from the merchant. The payer authentication request message is associated with the cardholder and includes data representing transaction card brands supported for payment, a response time limit, and/or item purchase information. The cardholder is prompted to enter access credential information. The entered access credential information is verified at the interchange computer. The cardholder is prompted to select a transaction card from one or more transaction cards associated with the cardholder. A payer authentication response message, which includes transaction card data associated with the selected transaction card, is transmitted from the interchange computer to the merchant.

In another aspect, a system for performing a financial transaction is provided. The system includes a database and an interchange computer. The database is configured to store transaction card data for a plurality of transaction cards associated with a cardholder. The interchange computer is configured to receive a payer authentication request message from a merchant. The payer authentication request message is associated with the cardholder and includes data representing transaction card brands supported for payment, a response time limit and/or item purchase information. The interchange computer is also configured to prompt the cardholder to enter access credential information and to verify the entered access credential information. The interchange computer is further configured to prompt the cardholder to select a transaction card from the plurality of transaction cards associated with the cardholder in the database and to transmit a payer authentication response message, which includes the transaction card data corresponding to the selected transaction card, to the merchant.

In yet another aspect, a computer device for performing a financial transaction is provided. The computer device is programmed to be coupled in communication with a database for storing data associated with a plurality of cardholders. The computer device is programmed to receive a payer authentication request message from a remote device. The payer authentication request message is associated with a cardholder and includes data representing transaction card brands supported for payment and/or item purchase information. The computer device is also programmed to prompt the cardholder to enter access credential information and to verify the entered access credential information by comparing the entered access credential information to data associated with the cardholder in the database. The computer device is further programmed to prompt the cardholder to select a transaction card from one or more transaction cards associated with the cardholder in the database and to transmit a payer authentication response message, which includes transaction card data associated with the selected card, to the remote device.

In still another aspect, a computer-readable medium is provided that includes computer executable instructions for performing a financial transaction using a database configured to store data associated with a plurality of cardholders. The computer executable instructions are configured to instruct a computer to receive a payer authentication request message from a merchant. The payer authentication request message is associated with a cardholder and includes data representing transaction card brands supported for payment, a response time limit, and/or item purchase information. The computer executable instructions are also configured to instruct the computer to prompt the cardholder to enter access credential information, verify the entered access credential information, and prompt the cardholder to select a transaction card from one or more transaction cards associated with the cardholder in the database. The computer executable instructions are further configured to instruct the computer to transmit a payer authentication response message, which includes transaction card data associated with the selected transaction card, to the merchant.

In a further aspect, a method is provided for performing an electronic purchase transaction using an interchange computer coupled to a database. The interchange computer and database are associated with an interchange network. The transaction is initiated by a cardholder with a merchant website associated with a merchant. The method includes receiving, at the interchange computer, a payer authentication request message from the merchant website. The payer authentication request message is associated with the cardholder and includes data representing transaction card brands supported for payment. The cardholder is prompted to enter access credential information. The entered access credential information is verified at the interchange computer. The cardholder is prompted to select a transaction card from one or more transaction cards associated with the cardholder and with a transaction card brand supported for payment. A payer authentication response message, which includes transaction card data associated with the selected transaction card, is transmitted from the interchange computer to the merchant website.

BRIEF DESCRIPTION OF THE DRAWINGS

FIG. 7 is a flowchart illustrating an exemplary process for using a protocol with extensions to communicate information between computer devices when performing a financial transaction in accordance with the present invention.

DETAILED DESCRIPTION OF THE INVENTION

Figure 1:
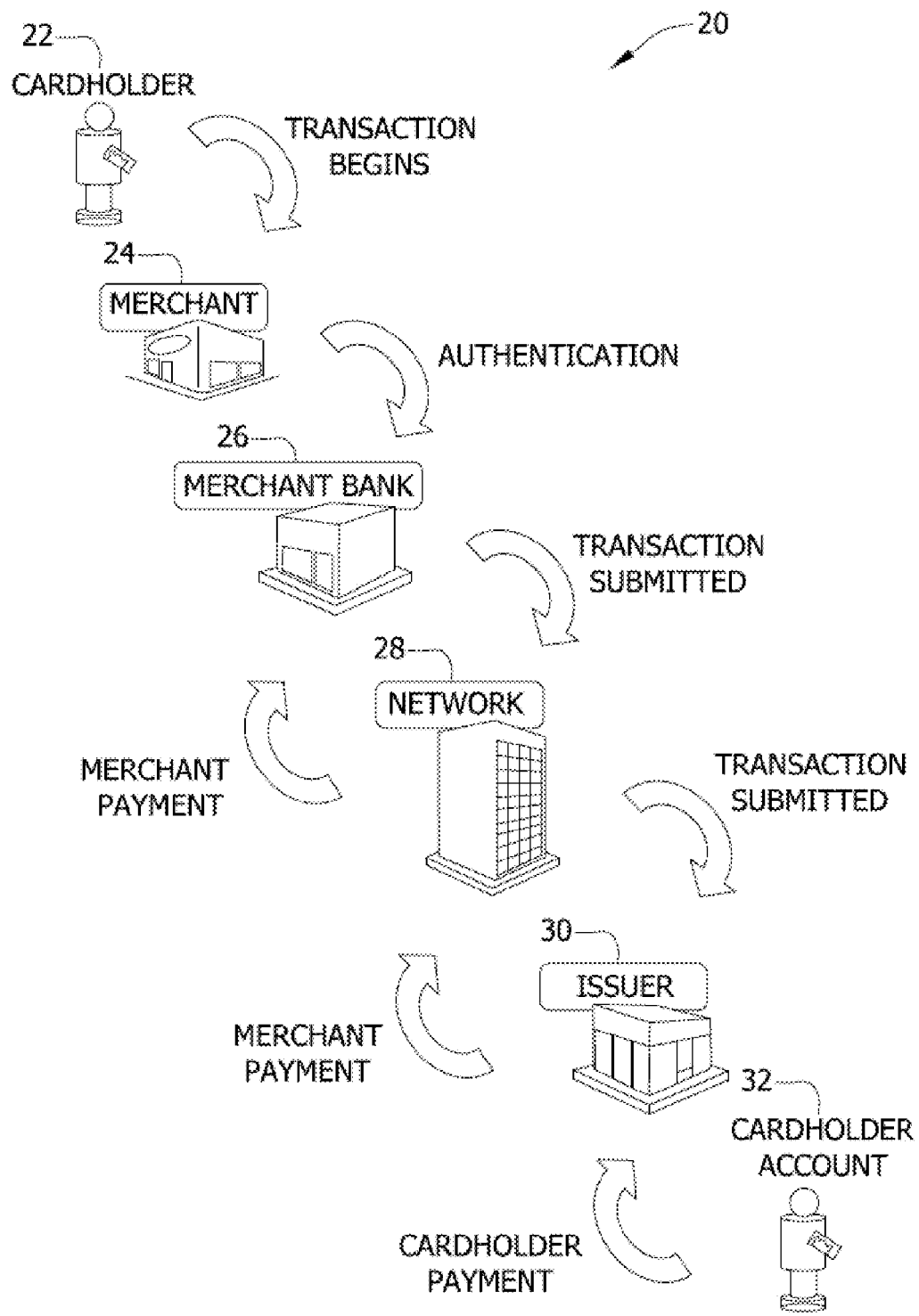
FIG. 1 is a schematic diagram illustrating a known multi-party transaction card industry system for enabling ordinary payment-by-card transactions in which the merchants and issuer do not need to have a one-to-one special relationship.

The methods and systems described herein relate to a financial transaction card payment system, such as a credit card payment system using the MasterCard® interchange (MasterCard is a registered trademark of MasterCard International Incorporated located in Purchase, N.Y.). The MasterCard® interchange is a proprietary communications standard promulgated by MasterCard International Incorporated® for the exchange of financial transaction data between financial institutions that have registered with MasterCard International Incorporated®.

The following detailed description illustrates embodiments of the invention by way of example and not by way of limitation. It is contemplated that the invention has general application to processing financial transaction data by a third party in industrial, commercial, and residential applications. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments provided herein facilitate decreasing manual order data input and increasing order data accuracy in connection with an online purchase transaction. Such embodiments further facilitate managing cardholder data (e.g., transaction card data and address data), which is usable with multiple merchant systems, in a single computer system with one set of access credentials for the user, thereby reducing the duplication of such cardholder data across merchant-specific user profile systems.

As used herein, the term "transaction card" or "payment card" refers to any suitable transaction card, such as a credit card, a debit card, a membership card, a promotional card, a frequent flyer card, an identification card, a prepaid card, a gift card, and/or any other device that may hold payment account information, such as mobile phones, personal digital assistants (PDAs), and key fobs.

The embodiments described herein are directed to systems and methods for using a protocol having extensions for communicating information between computer devices when performing a financial transaction over the computer devices. The financial transaction is performed by a user of a financial transaction card, such as a credit card, debit card, or other financial transaction card. These users are referred to as cardholders. A cardholder is issued a transaction card by an issuer or an issuing bank. The cardholder is able to use the transaction card at participating merchants to initiate financial transactions. The merchant processes these transactions using a point-of-sale (POS) device that captures certain transaction information and communicates this information over an interchange network to an acquiring bank and ultimately to the issuer. Information is then exchanged between these parties over the interchange network until the transaction is completed. The computer devices communicate with one another by using a standard computer protocol.

In the exemplary embodiment, the systems and methods use extensions that have been added to the protocol to provide additional information between the computer devices when performing a financial transaction between a cardholder and a merchant over the interchange network. The extensions are added to the protocol, which is the defined communication framework controlling the exchange of data between the computer devices. The protocol described herein is an authentication protocol commonly used to provide increased security in financial card transactions. The authentication protocol permits the cardholder to establish authentication credentials (e.g., a username and/or password) for the transaction card issued to them. When the cardholder later attempts to perform a financial transaction with the card, the cardholder must provide, in addition to a credit card number or other assigned number, the associated authentication credentials to complete the transaction.

The authentication protocol thus provides a standard method of establishing and communicating the authentication credentials in conjunction with financial card transactions. In operation, the authentication protocol defines the format and specific types of information exchanged between a cardholder, a merchant, and the interchange network. Utilizing extensions to the authentication protocol permits additional information to be transferred between the merchant, the interchange network, and the cardholder without requiring the development and implementation of either a new protocol or additional network infrastructure. The information contained in the extensions is thus communicated between the merchant and the interchange network using the known authentication protocol.

In operation, a cardholder initiates a financial transaction with a merchant (e.g., directly or over an interchange network) via a client computer device associated with the cardholder. Via an input device of the client computer device, the cardholder indicates to a merchant computer system the cardholder's intention to use an express check out option offered by the merchant to complete the transaction. In an exemplary embodiment, the client computer device transmits a purchase request message to the merchant computer system.

The merchant computer system is configured to execute a merchant plug-in (MPI) software component for verifying financial transactions. Accordingly, the merchant computer system and/or the MPI software component may be referred to as an MPI device. The MPI device is utilized by the merchant to communicate an account number to a server system associated with the interchange network, also referred to as an interchange computer system herein. In an exemplary embodiment, the MPI device receives the purchase request from the client computer device and, in response, transmits a verify enrollment request (VEReq) message including the account number to a directory server of the interchange computer system.

According to one embodiment, the account number is specific to (e.g., assigned to) the cardholder/user, while in other embodiments, the account number is a predefined or static number provided by the merchant to the directory server. In either embodiment, the directory server checks the enrollment status of the account number against a list of enrolled account numbers (e.g., to determine whether the account number is enrolled in a secure transaction processing program and/or a cardholder authentication program), and returns a verify enrollment response (VERes) message to the MPI device indicating the status of the enrollment of the account number. For example, if the account number is included in the list of enrolled account numbers, the directory server transmits a VERes message with a positive (e.g., true or "yes") response verifying the enrollment of the cardholder. If the account number is not included in the list of enrolled account numbers, the directory server transmits a VERes message with a negative (e.g., false or "no") response.

The cardholder proceeds to select, using the input device, the items (e.g., products and/or services) which the cardholder desires to purchase from the merchant. Alternatively, the cardholder may select such items prior to indicating an intention to use the express check out feature. After the user has selected items to purchase and the MPI device has received a VERes message with a positive response, the MPI device generates a payer authentication request (PAReq) message with one or more predefined extensions and transmits the PAReq message to the interchange computer system. For example, the MPI device may transmit the PAReq message to a check out platform of the interchange computer system.

The PAReq extensions include at least a brands supported extension, a purchase details extension, and/or a time limit extension. A brands supported extension indicates the different types of transaction cards that the merchant will accept to complete the current transaction. In one embodiment, the brands supported extension includes a collection of one or more payment brands (e.g., interchange networks) with which the merchant is associated. For example, the PAReq message may include an identifier of each interchange network through which the merchant has agreed to submit transactions.

A purchase details extension includes detailed information for one or more items being purchased by the cardholder. For example, a purchase details extension may include, without limitation, an item identifier (e.g., a stock keeping unit (SKU) number), an item category (e.g., food or clothing), an item name, and/or an item price.

A time limit extension includes an amount of time (i.e., a duration) that the MPI device will wait for a response to a PAReq message. In one embodiment, if the MPI device has not received a payer authentication response (PARes) message for the PAReq message within the duration, the MPI device may abort processing of the transaction.

Upon receipt of the PAReq message, the interchange computer system (e.g., the check out platform) prompts the cardholder to enter access credential information, such as, but not limited to, a username, a password, a security token, and/or biometric data. In one embodiment, the interchange computer system receives a request that originates at the client computer device and is forwarded to the interchange computer system by the MPI device. In another embodiment, the MPI device refers the client computer device to an address (e.g., a uniform resource indicator (URI)) associated with the interchange computer system, and the interchange computer system receives a request directly from the client computer device. In either embodiment, the interchange computer system prompts the cardholder for credential access information by providing a user interface to the client computer device.

The cardholder enters the access credential information, and the interchange computer system receives the access credential information from the client computer device. The interchange computer system verifies the access credential information. If the verification succeeds (e.g., the access credential information matches access credential information stored by and/or calculated by the interchange computer system), the interchange computer system prompts the cardholder for payment information for the current transaction. Payment information includes, without limitation, transaction card information, contact information (e.g., an email address and/or a telephone number), a promotion code, billing information, and/or shipping information. Transaction card information may include, for example, a card identifier (e.g., an account number, a partial account number, and/or a card name), a security code, and/or an expiry date. Shipping information may include, for example, a delivery address and/or delivery instructions.

In some embodiments, the interchange computer system prompts the cardholder to select from one or more options indicating previously stored payment information. For example, the interchange computer system may prompt the cardholder to select a transaction card from one or more transaction cards previously associated with the cardholder. The interchange computer system may similarly prompt the cardholder to select any other payment information. In one embodiment, the interchange computer system includes in the collection of transaction cards only cards that are associated with a brand (e.g., an interchange network) indicated by the brands supported extension in the PAReq message.

The interchange computer system receives the payment information from the client computer device, generates a payer authentication response (PARes) message, including the payment information in one or more extensions, and transmits the PARes message to the MPI device. In one embodiment, the interchange computer system receives a selected transaction card identifier from the client computer device and retrieves an account number (e.g., a primary account number (PAN)), a security code (e.g., a CVC2 code and/or a personal identification number (PIN)), and/or an expiry date based on the selected transaction card identifier. PARes extensions may include at least a PAN extension, a security code extension, an expiry date extension, a phone number extension, a promotion code extension, a shipping information extension, and/or a billing information extension.

The MPI device receives the PARes message from the interchange computer system. In some embodiments, the merchant computer system populates one or more fields relating to the pending transaction based on information from PARes extensions, thus relieving the user of the need to provide the information manually. For example, the information received can include the user's full name and shipping address, which are automatically populated in an order form. The total cost of the transaction may then be calculated based at least in part on some portion of the received information (e.g., the shipping costs are calculated based on the shipping address).

At this point, the transaction may be processed according to known methods to complete the purchase. For example, the interchange computer system may transmit transaction information to a merchant bank and/or an issuer bank associated with the transaction. In addition, the MPI device may transmit a second VEReq message, including final transaction information in one or more VEReq extensions. VEReq extensions include, without limitation, a final transaction amount extension, an approved/declined extension, a promotion code usage extension, and a transaction ID extension. For example, the MPI device may specify a final transaction amount, which accounts for any applicable sales tax, shipping costs, and/or discounts, in the final transaction amount extension. The approved/declined extension may include an authorization response code received by the merchant computer system when processing the transaction. The promotion code usage extension may include an indication of any promotion codes used in connection with the transaction. A promotion code is an identifier associated with a discount, a merchant credit, a financial institution credit, a rebate, and/or any adjustment applied to a purchase transaction to reduce a total transaction amount. The transaction ID extension may include a unique identifier generated by the MPI device and/or the interchange computer system to identify a plurality of related transactions.

The interchange computer system receives the second VEReq message and recognizes (e.g., based on a transaction ID) the second VEReq message as being associated with the financial transaction for which the first VEReq message and the PAReq message were previously received. The interchange computer system stores at least a portion of the data in the VEReq extensions. For example, the interchange computer system may associate the final transaction amount and/or promotion code usage with other information (e.g., item information) related to the transaction. Because the interchange computer system has determined that verify enrollment and payer authentication have already been performed for the financial transaction, the interchange computer system transmits a negative VERes message to the MPI device, which terminates execution with respect to verify enrollment and payer authentication of the current transaction in response. The MPI device completes execution of the financial transaction, such as by subsequently settling the transaction.

A technical effect of the systems and methods described herein includes at least one of a) receiving, at an interchange computer, a verify enrollment request including an account number, b) determining whether cardholder authentication is available for the account number, c) transmitting, by the interchange computer, a verify enrollment response indicating whether cardholder authentication is available, d) receiving, at the interchange computer, a payer authentication request message from the merchant, the payer authentication request message associated with the cardholder and including data representing at least one of transaction card brands supported for payment, a response time limit, and item purchase information, e) prompting the cardholder to enter access credential information, f) verifying the entered access credential information at the interchange computer, g) prompting the cardholder to select a transaction card from one or more transaction cards associated with the cardholder, and h) transmitting a payer authentication response message from the interchange computer to the merchant, the payer authentication response message including transaction card data associated with the selected transaction card, i) receiving, at the interchange computer, a second verify enrollment request including a total transaction amount, j) associating the total transaction amount with the transaction at the interchange computer, and/or k) transmitting by the interchange computer a negative verify enrollment response.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T, New York, N.Y.). The application is flexible and designed to run in various different environments without compromising any major functionality.

The systems and processes are not limited to the specific embodiments described herein. In addition, components of each system and each process can be practiced independent of and separate from other components and processes described herein. Each component and process also can be used in combination with other assembly packages and processes.

FIG. 1 illustrates a known multi-party transaction card industry system 20 for enabling ordinary payment-by-card transactions in which a merchant 24 and an issuer 30 do not need to have a one-to-one special relationship. A financial institution 30 called the "issuer" provides a card, such as a credit card, to a cardholder 22, who uses the card to tender payment for a purchase from a merchant 24. To accept payment with the card, merchant 24 must normally establish an account with a financial institution 26 called the "merchant bank," "acquiring bank," or "acquirer bank." When cardholder 22 tenders payment for a purchase with a card, merchant 24 requests authorization from merchant bank 26 for the amount of the purchase. The request may be performed over the telephone, but is usually performed through the use of a point-of-sale terminal, which reads the cardholder's account information from the magnetic stripe or chip on the card and communicates electronically with the transaction processing computers of merchant bank 26. Alternatively, merchant bank 26 may authorize a third party called a "merchant processor," an "acquiring processor," or a "third party processor" to perform transaction processing on its behalf. In this case, the point-of-sale terminal will be configured to communicate with the third party. A point-of-sale terminal may include without, limitation, a computer system operated by a merchant and/or by a cardholder.

Using an interchange computer system that is associated with a interchange network 28, the computers of merchant bank 26 communicate with the computers of issuer bank 30 to determine whether a cardholder's account 32 is in good standing and whether the purchase is covered by the consumer's available credit line. Based on these determinations, the request for authorization will be declined or accepted. If the request is accepted, an authorization code is issued to merchant 24 and an available credit line of cardholder's account 32 is decreased.

Normally, a charge for a credit transaction is not posted immediately to cardholder's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated.

After a transaction is captured, the transaction is settled between merchant 24, merchant bank 26, interchange network 28, and issuer 30. Settlement refers to the transfer of financial data or funds between merchant 24, merchant bank 26, interchange network 28, and issuer 30 related to the transaction. Usually, transactions are captured and accumulated into a "batch," which are settled as a group. More specifically, a transaction is typically settled between issuer 30 and interchange network 28, and then between interchange network 28 and merchant bank 26, and then between merchant bank 26 and merchant 24.

Financial transaction cards or payment cards can refer to credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
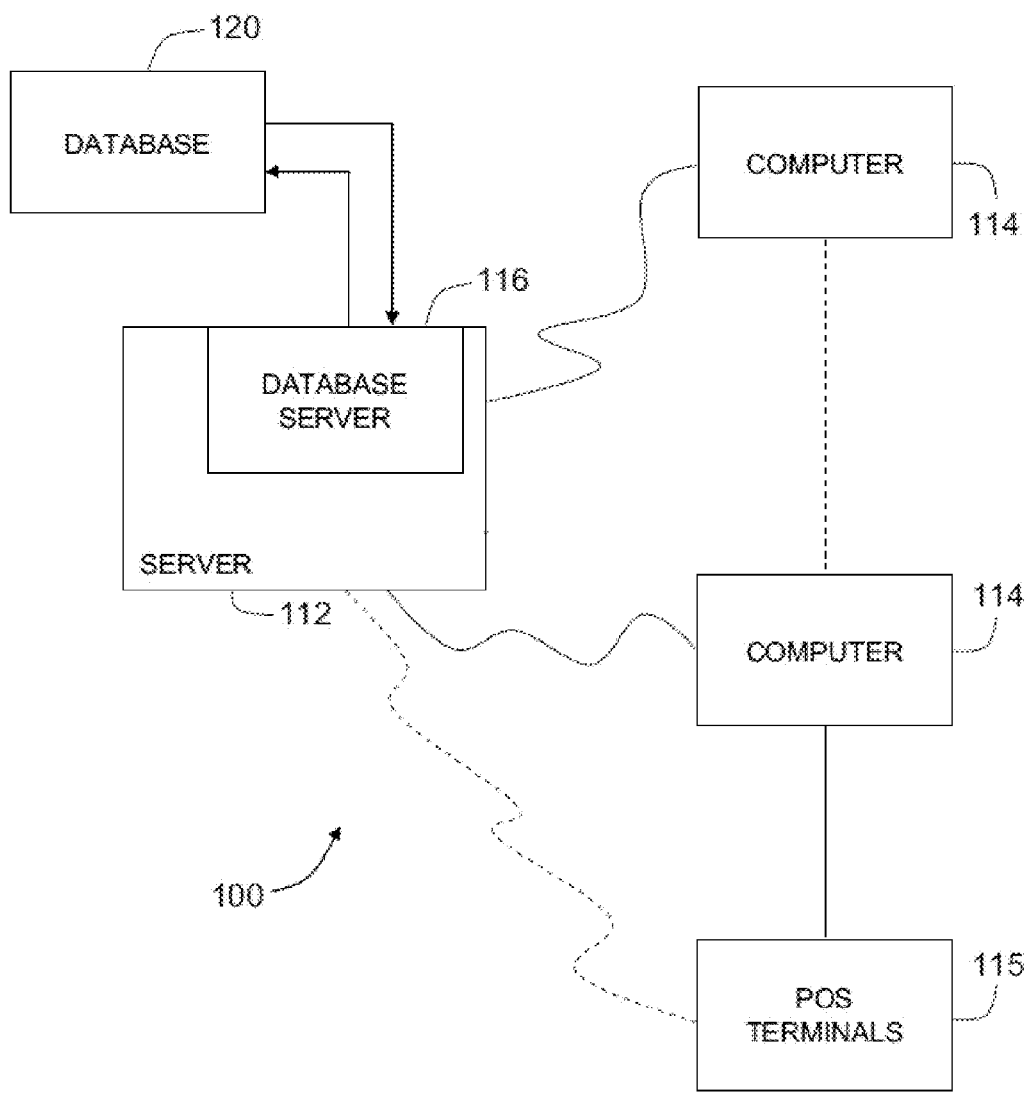
FIG. 2 is a simplified block diagram of a typical server architecture of a system that facilitates authenticating an identity of a customer in accordance with the present invention.

FIG. 2 is a simplified block diagram of an exemplary system 100 in accordance with one embodiment of the present invention. In the exemplary embodiment, system 100 facilitates ensuring that a person attempting to use a card or its corresponding account numbers is the legitimate cardholder. More specifically, in the exemplary embodiment, system 100 includes a server system 112 communicatively coupled to a plurality of client systems 114, which may include one or more input devices (shown in FIG. 4). Server system 112 may also be referred to as an interchange computer system.

In the exemplary embodiment, client systems 114 are computers that include a web browser, which enable client systems 114 to access server system 112 using the Internet. More specifically, client systems 114 are communicatively coupled to the Internet through many interfaces including, but not limited to, at least one of a network, such as the Internet, a local area network (LAN), a wide area network (WAN), and/or an integrated services digital network (ISDN), a dial-up-connection, a digital subscriber line (DSL), and a cable modem. Client systems 114 can be any device capable of accessing the Internet including, but not limited to, a desktop computer, a laptop computer, a personal digital assistant (PDA), or other web-based connectable equipment.

System 100 also includes point of sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's financial transaction card.

A database server 116 is communicatively coupled to a database 120 that contains a variety of information including, but not limited to, a name of a cardholder, an account number, a transaction history, an item purchase history, a billing address, a shipping address, the cardholder's date of birth, telephone number(s) associated with the cardholder (e.g., a mobile, home, or fax telephone number), email addresses associated with the cardholder, and other cardholder-related information. Moreover, the database 120 can include multiple account numbers for an account holder. In addition, each particular account number can have its own corresponding set of information specific for the particular account number. For example, different account numbers can have different shipping addresses associated therewith. In the exemplary embodiment, database 120 is stored remotely from server system 112. In an alternate embodiment, database 120 is decentralized. In the exemplary embodiment, a person can access database 120 via client systems 114 by logging onto server system 112.

The database 120 also includes information relating to the authentication protocol described above. According to some embodiments, the authentication protocols may be referred to as Three Domain Protocol (3-D Secure®) (3-D Secure is a registered trademark of Visa International Service Association located in Foster City, Calif.) or MasterCard SecureCode® (MasterCard SecureCode is a registered trademark of MasterCard International Incorporated located in Purchase, N.Y.). The authentication protocol in these embodiments is utilized by other financial card companies as well. The authentication protocol defines a standard for utilizing authentication credentials (e.g., a username and/or password) to verify the identity of a user of a financial card. The standard for utilizing authentication credentials includes, for example, procedures for establishing the credentials, procedures for requesting and verifying the veracity of the credentials, and standards for communicating the results of the verification of the credentials to the directory server (e.g., interchange network) and/or the issuing bank. Protocols in general are commonly recognized as a set of rules governing the format of messages that are exchanged between computers. For example, a protocol may be a specific set of rules, procedures, or conventions relating to format and timing of data transmission between two devices.

Methods described herein may be practiced at least in part by communicating information in extension data fields ("extensions") that are included in messages defined by one or more protocols. Extensions represent data fields that are added to such messages in accordance with a protocol. The use of extensions allows enhanced transaction processing within the scope of an existing protocol.

Extensions described herein may include and/or support a variety of information that is communicated in accordance with the authentication protocols. The extensions thus utilize the underlying infrastructure of the authentication protocols, without requiring modification of the protocols, to communicate information between the merchant plug-in, the directory server, and the express check out platform. The content of the information included within the extensions varies based on the type of communication being made. For the purposes of discussion herein, four types of communication are provided, although additional types of communication are contemplated as well.

In one embodiment, the four communication types include: a verify enrollment request (VEReq), a verify enrollment response (VERes), a payer authentication request (PAReq), and a payer authentication response (PARes). Specific examples of the use of the types of communication are discussed in greater detail below. Table 1 summarizes the fields included within the extensions and the types of communications with which they are utilized.

In the example embodiment, server system 112 may be associated with a interchange network, and may be referred to as an interchange computer system. Additionally, a check out platform may be associated with the interchange network. Server system 112 may be used for processing transaction data and for registering cardholders into a plurality of programs offered by the interchange network. In addition, at least one of client systems 114 may include a computer system associated with an issuer of a transaction card. Accordingly, server system 112 and client systems 114 may be utilized to process transaction data relating to purchases made by a cardholder utilizing a transaction card that is processed by the interchange network and issued by the associated issuer. Another client system 114 may be associated with a user or a cardholder seeking to register, access information or process a transaction with at least one of the interchange network, the issuer, the POS, or the MPI device.

TABLE 1

| Field | Description | VEReq | VERes | PAReq | PARes |
|---|---|---|---|---|---|
| Billing Info | Billing address for the cardholder | | | | X |
| Brands Supported | List of payment brands supported by merchant | | | X | |
| Security Code | 3 or 4 digit number associated with provided PAN | | | | X |
| Expiry Date | Expiration date for the associated PAN | | | | X |
| Final Amount | Total amount of the authorization request including merchandise, tax, and shipping | X | | | |
| PAN | Account number selected for payment. This may be the real account number or a psuedo number otherwise representing the real number to be used for payment | | | | X |
| Phone Number | Primary phone number for the cardholder | | | | X |
| Promotion Code and/or Loyalty Numbers | Special code used to identifiy qualifying transactions for specific offers or sales at the merchant | | | | X |
| Purchase Details | Detailed information of the items being purchased | | | X | |
| Shipping Info | Shipping address information | | | | X |
| Time Limit | Amount of time merchant will wait for a response in seconds | | | X | |
| Approved/Declined | Authorization response code | | X | | |
| Promotion Code Usage | Indicator as to whether or not promotion code or loyalty number was used for the specified transaction | | X | | |
| Transaction ID | Checkout platform generated unique id to identify related transactions | | X | | |

The extension fields define specific types of information included within the extensions of the authentication protocol. For example, the billing info field includes information relating to the billing address for the cardholder and is used in the PARes message. The brands supported field includes or is formatted to receive a list of payment brands (e.g., interchange networks and/or types of financial transaction cards) supported by the merchant and is used in the PAReq message. Although certain data fields are shown to be included within different extensions (e.g., the PAReq extension includes the brands supported data field, the purchase details data field, and the time limits data field), it should be understood that included within the scope of this disclosure is that other data fields could be included with any of the extensions (VEReq, PAReq, and PARes) described herein or other data fields could be included with other extensions supported by the protocol. The data fields and the extensions described herein are for exemplary purposes and should not be considered limiting.

The embodiments illustrated and described herein as well as embodiments not specifically described herein but within the scope of aspects of the invention constitute exemplary means for performing a financial transaction, and more particularly, constitute exemplary means for performing a financial transaction utilizing extensions to an authentication protocol. For example, the server system 112, POS terminal 115, or the client system 114, or any other similar computer device, programmed with computer-executable instructions to execute processes and techniques with a processor as described herein, constitutes exemplary means for utilizing extensions to an authentication protocol in performing a financial transaction for a user of a financial transaction card.

Figure 3:
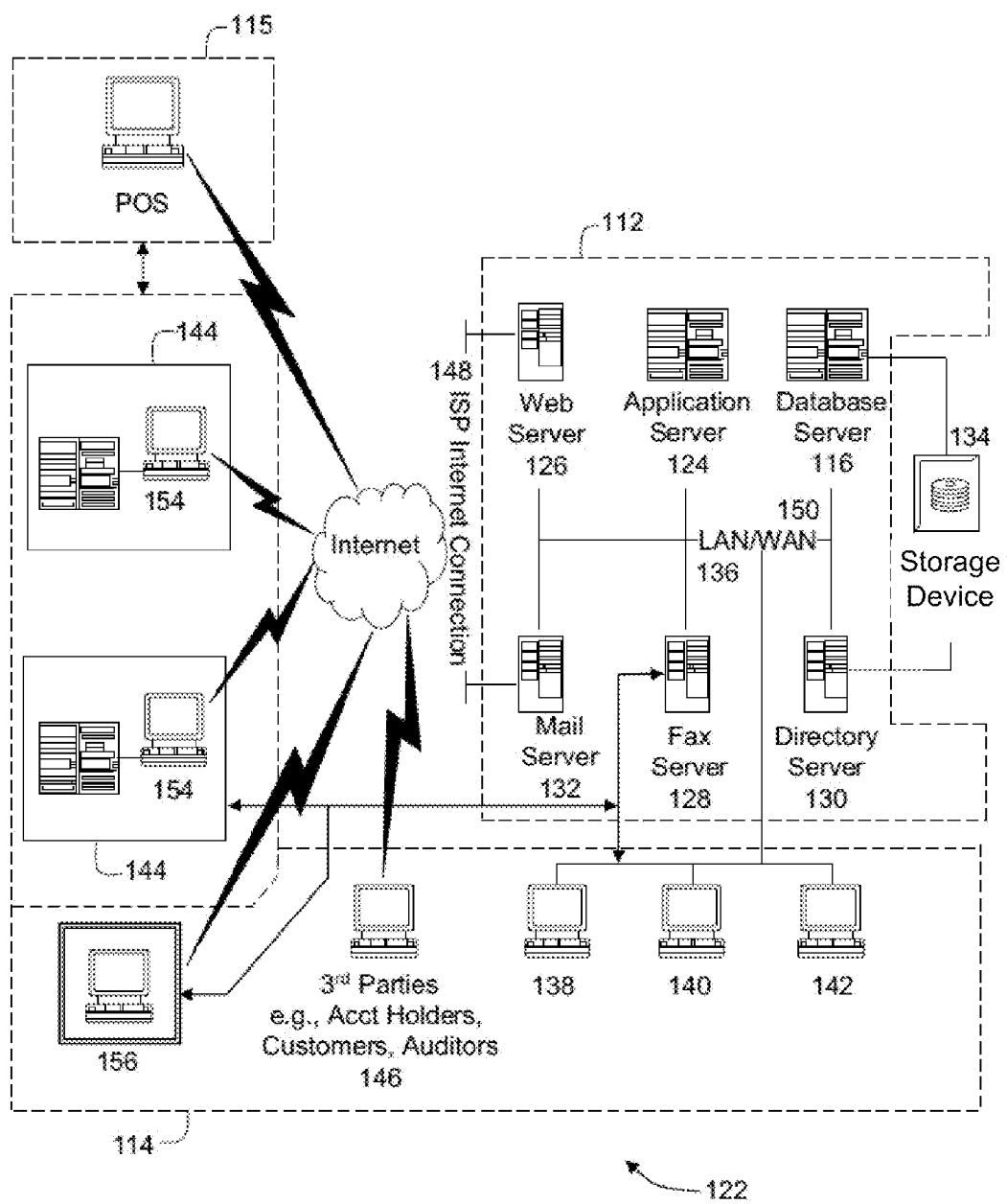
FIG. 3 is an expanded block diagram of the typical system shown in FIG. 2 in accordance with the present invention.

FIG. 3 is an expanded block diagram of an exemplary system 122 in accordance with one embodiment of the present invention. The components of system 122, which are identical to components of system 100 (shown in FIG. 2), are identified in FIG. 3 using the same reference numerals as used in FIG. 2. System 122 includes server system 112, client systems 114 and POS terminals 115. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 146 using a telephone link. Fax server 128 is configured to communicate with other client systems 138, 140, and 142 as well.

As used herein, the terms "software" and "firmware" are interchangeable, and include any computer program stored in memory for execution by personal computers, workstations, clients and servers, including random access memory (RAM), read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Figure 4:
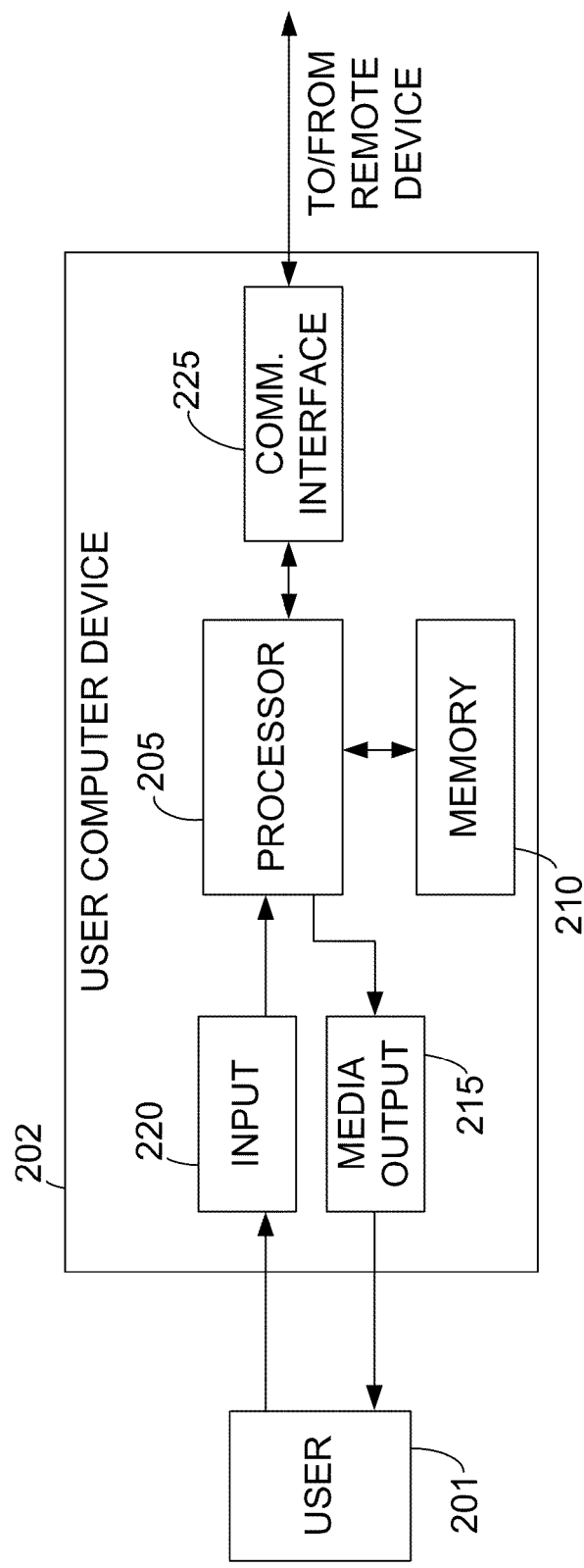
FIG. 4 illustrates an exemplary configuration of a client system shown in FIGS. 2 and 3.

FIG. 4 illustrates an exemplary configuration of a user computer device 202 operated by a user 201. User computer device 202 may include, but is not limited to, client systems 114, 138, 140, and 142, POS terminal 115, workstation 154, and manager workstation 156.

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or transaction data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively couplable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. A graphical user interface may include, for example, an online store interface for viewing and/or purchasing items, and/or a wallet application for managing payment information.

In some embodiments, user computer device 202 includes an input device 220 for receiving input from user 201. User 201 may use input device 220 to select and/or enter, without limitation, one or more items to purchase, a purchase request, access credential information, and/or payment information. Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from server system 112. A client application allows user 201 to interact with a server application of a merchant computer system, POS terminal 115, and/or server system 112.

Figure 5:
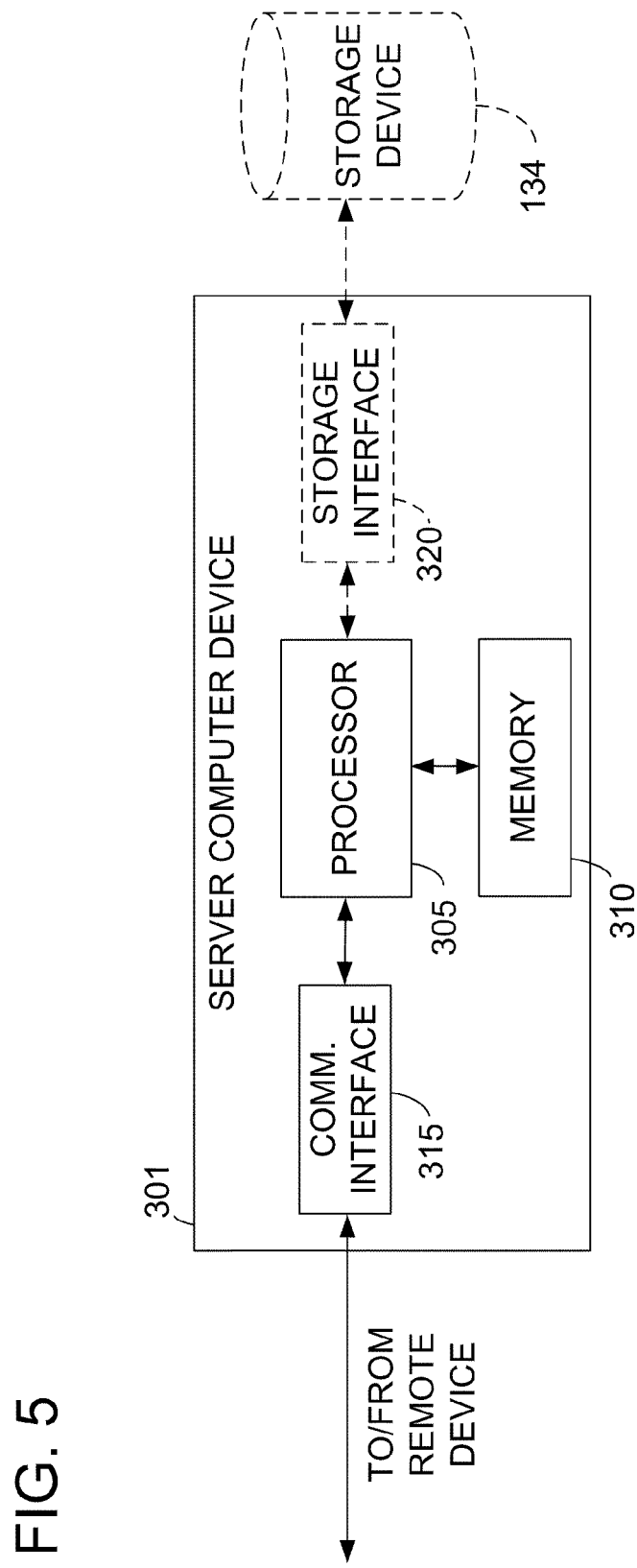
FIG. 5 illustrates an exemplary configuration of a server system shown in FIGS. 2 and 3.

FIG. 5 illustrates an exemplary configuration of a server computer device 301 such as server system 112 (shown in FIG. 2). Server computer device 301 may include, but is not limited to, a merchant computer system, POS terminal 115, database server 116, application server 124, web server 126, fax server 128, directory server 130, and/or mail server 132.

Server computer device 301 also includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114 via the Internet, as illustrated in FIG. 3.

Processor 305 may also be operatively coupled to a storage device 134. Storage device 134 is any computer-operated hardware suitable for storing and/or retrieving data, such as, but not limited to, data associated with database 120. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks and/or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Figure 6:
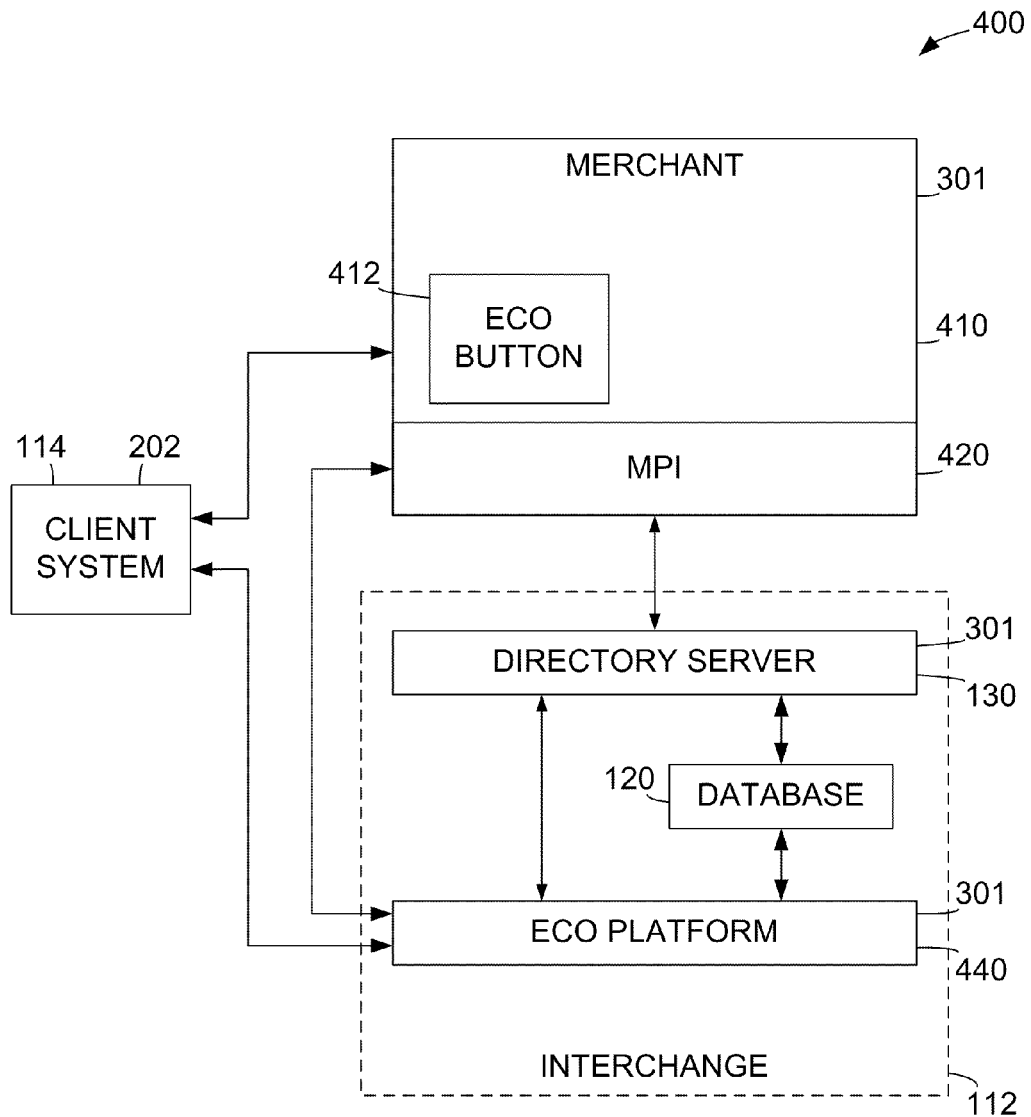
FIG. 6 is a block diagram of a system showing data flow between various computer devices using a protocol with extensions in accordance with the present invention.

FIG. 6 is a block diagram of an exemplary system 400 showing data flow between user computer devices 202 and server computer devices 301 using a protocol with extensions. Included in the system 400 is a merchant computer system 410, a merchant plug-in (MPI) device 420, a directory server 130, an express check out platform 440, and a client system 114 that is associated with a cardholder. Merchant computer system 410 provides an express check out button 412 to the client system 114, which enables a cardholder to perform a transaction using express check-out functionality. In an exemplary embodiment, the directory server 130 and the express check out platform 440 are included in interchange computer system 112, which may also include a database 120.

Merchant computer system 410 and/or MPI device 420 may host a website. For example, merchant computer system 410 may host an electronic commerce website for selling goods and/or services via the Internet. The merchant plug-in device 420 is an add-on software, hardware, or service-provided module that is communicatively coupled to the merchant computer system 410. For example, if the merchant plug-in device 420 is a software module, it may be stored in the memory area 310 (shown in FIG. 5) of the merchant computer system 410, while if it is a hardware or service-provided module it is communicatively coupled to the merchant computer system 410.

The MPI device 420 functions as an interface between the merchant computer system 410 and the directory server 130 and the express check out (ECO) platform 440. The MPI device 420 may be of the type used in known authentication protocol systems. The merchant computer system 410 and/or the MPI device 420 may have databases 120 (shown in FIG. 2) with information stored therein that is included in the extension. The express check out button 412 is an object presented to the user. The express check out procedure is initiated upon selection of the express check out button 412 at client system 114. The express check out procedure uses the information contained in the extensions to the authentication protocol in the execution of a financial transaction using the card.

The directory server 130 is associated with the interchange network in the exemplary embodiment, and functions accordingly as described above. The directory server 130 operates in the same manner as the type used in known authentication protocol systems. While shown as separate in FIG. 6, the express check out platform 440, the directory server 130, and the database 120 may reside on the same server computer device 301 according to one embodiment. Alternatively, the express check out platform 440, the directory server 130, and/or the database 120 may be distributed across multiple server computer devices 301.

The express check out platform 440 is coupled to the database 120, which contains cardholder information, account information, transaction information, and/or any other information that can be formatted for inclusion in messages transmitted between merchants and the interchange computer system 112. As described above, the information is related to the card and/or the cardholder. For example, the information can include the card account number, expiry date, CVC2 code, billing and/or shipping addresses. The information may be populated in the database 120 by retrieval from within the interchange computer system 112 or it may be supplied by the user at the client system 114. For example, the express check out platform 440 may provide to the client system 114 a card management interface that enables the user to define and manage transaction card information for each of a plurality of transaction cards. In addition, for each card that has information stored in the database, additional entries are created for card-specific information such as billing and shipping addresses. Accordingly, different cards may have identical or different billing and/or shipping addresses. As shown in FIG. 6, the express check out platform 440 may transmit and receive information (e.g., extensions to the protocol) to and from both the directory server 130 and the MPI device 420.

FIG. 7 is a flowchart 500 illustrating an exemplary process for using protocol extensions to communicate information between computer devices when performing a financial transaction. In the exemplary embodiment, flowchart 500 illustrates an exemplary process that can be implemented by system 100 (shown in FIG. 2). The process described in flowchart 500 relates to the receiving and transmitting of messages and information between the merchant computer system 410, the MPI device 420, the directory sever 130, the express check out platform 440, and the database 120. While operations within the flowchart 500 are described below with regard to particular devices and/or systems, each of the merchant computer system 410, the MPI device 420, the directory sever 130, the express check out platform 440, and the database 120 may be operable to (e.g., may be programmed to) perform such operations.

The process begins when the user finishes selecting items to purchase and initiates the express check out program by selecting the express check out button 412 (shown in FIG. 6). A verify enrollment request (VEReq) message is initiated when the express check out button 412 is selected. The verify enrollment request is received 505 by the directory server from the MPI device. In operation, when a user indicates an intention to use an express check out option, the MPI device is utilized by the merchant to communicate an account number to the directory server. According to one embodiment, the account number is specific to the user, while in other embodiments, it is a static number provided by the merchant to the directory server. This communication is a verify enrollment request (VEReq), and it includes the account number.

The directory server determines 510 whether cardholder authentication is available for the account number. In embodiments where a static number is utilized, a corresponding static number is maintained in a database on the directory server; in embodiments utilizing a user-specific account number, the account number provided by the MPI device is compared to a list stored within the database of enrolled user-specific account numbers. The list of enrolled account numbers in the database is either populated when a user enrolls their specific account in the express check out program or, in the case of static numbers, the list is populated by the merchant, the directory server, and/or the express check out platform.

If the account number is not verified (i.e., the account number is not included in the list of enrolled account numbers), a negative verify enrollment response (VERes) message is transmitted 512 to the MPI device by the directory server. The MPI device may continue processing the transaction without authentication or may terminate processing of the transaction. If the account number is verified, the directory server transmits 515 a positive VERes message to the MPI device.

When the positive VERes message has been received, the merchant computer system (e.g., the MPI device) transmits a payer authentication request (PAReq) message, including one or more extensions, to the express check out platform. In some embodiments, the user selects items to purchase and selects an express check out option. In response, the merchant computer system transmits a VEReq message, receives a VERes message, and transmits a PAReq message. In other embodiments, the user selects the express check out option before selecting one or more items to purchase. In response to the selection of the express check out option, the merchant computer system transmits the VEReq message and receives the VERes message. The user indicates that item selection is complete, and, in response, the merchant computer system transmits the PAReq message.

The express check out platform receives 520 the PAReq message, which includes extensions, as described in more detail above (e.g., in Table 1). For example, the PAReq message may include a collection of supported payment brands, a response time limit, and/or item purchase information describing one or more items being purchased by the user.

In response to receiving the PAReq message, the express check out platform prompts 525 the user to enter access credential information. For example, the express check out platform may prompt 525 the user for a username, a password, a security token, and/or biometric data (e.g., a fingerprint).

The express check out platform verifies 530 the access credentials provided by the user. If the verification fails, the express check out platform transmits 532 a negative payer authentication response (PARes) message to the merchant computer system indicating that the authentication failed. Alternatively, if the verification fails, the express check out platform may repeatedly prompt 525 the user for and verify 530 access credential information. If the access credential information is not successfully verified after a predefined number of times (e.g., three or five), the express check out platform transmits 532 the negative PARes message.

When the access credential information is successfully verified, the express check out platform prompts 535 the user to enter payment information. For example, the user may be prompted to select a transaction card from one or more transaction cards previously associated with the user in the database and/or to select a shipping address from one or more addresses previously associated with the user in the database. The user may also have previously stored other payment information, including, without limitation, delivery instructions (e.g., a location at which to deliver a package and/or whether to require a signature), in the database. Any such payment information may be presented to the user by the express check out platform for selection and/or confirmation.

In addition, the express check out platform may allow the user to update payment information and/or enter new payment information.

The express check out platform receives the payment information from the user and optionally associates 540 the transaction information with the user in the database. The transaction information may include, without limitation, information received from the merchant computer system (e.g., in the VEReq message and/or the PAReq message) and/or payment information provided by the user. For example, item purchase information may be associated with the user in the database to create an item purchase history.

The express check out platform transmits 545 a positive payer authentication response (PARes) message to the merchant computer system, including the payment information provided by the user. In one embodiment, the payment information is included as one or more extensions to a PARes message.

The merchant computer system (e.g., the MPI device) receives the positive PARes message and extracts the payment information from the PARes message. The merchant computer system populates one or more fields relating to the pending transaction with the payment information, thus relieving the user of the need to provide the information manually. For example, the merchant computer system may provide a payment form and/or order form to the user for confirmation, with one or more fields populated with the payment information. Alternatively, the merchant computer system may simply proceed with processing the transaction without further input from the user.

In one example, the payment information received in the PARes message includes, without limitation, the user's full name and shipping address, which is then automatically populated in a purchase order. By eliminating the user from the data entry process, the accuracy of the information is greatly increased. The time required to complete the transaction is significantly reduced as well as the user does not manually enter the information. Furthermore, after the enrollment status of the user is confirmed and they provide the proper authentication credentials, information may be provided in the extension which includes account numbers for a plurality of cards. The user may then select a desired card to complete the transaction. This information is provided by either of the directory server of the express check out platform in the PARes. Accordingly, a user need only remember their authentication credentials, as the account number in the VEReq may be a static number provided by the merchant plug-in, and may thus utilize any one of a plurality of cards to complete a transaction with the merchant.

The positive PARes message sent by the express check out platform indicates that the merchant is approved to proceed with processing and/or executing the financial transaction. For example, based on the positive PARes message, the merchant computer system may transmit an authorization request for the financial transaction (e.g., to an interchange network or an issuer). In one embodiment, the PARes message includes an indication of an interchange network associated with a selected transaction card, and the merchant submits the authorization request to the indicated interchange network. The indicated interchange network may be the same as or different from the interchange network associated with the interchange computer system that includes the directory server and the express check out platform.

The merchant computer system receives an authorization response including an authorization response code indicating whether the transaction was approved or declined. The merchant computer system (e.g., the MPI device) transmits a second VEReq message for the transaction to the directory server, including the authorization response code, a final transaction amount, a promotion code associated with the transaction (e.g., indicating a discount applied to the transaction), and/or a transaction identifier (ID). The final transaction amount may be calculated by the merchant computer system based at least in part on some portion of the information sent by the express check out platform in the PARes message. For example, sales tax and/or shipping costs may be calculated based on a selected shipping address.

The express check out platform receives 550 the second VEReq message and optionally associates 555 at least some of the transaction information from the VEReq message with the user and/or with the transaction in the database. The express check out platform transmits 560 a negative VERes message to the merchant computer system. In response, the merchant computer system terminates processing of the transaction, aside from completing (e.g., settling) the transaction according to known methods if the authorization was approved.

In some embodiments, one or more messages sent between the different computer systems (e.g., the VEReq, VERes, PAReq, and PARes messages), or a portion thereof, are encrypted by the sending device and decrypted by the receiving device. For example, the PARes message may be encrypted by the express check out platform and decrypted by the MPI device. In one embodiment, the express check out platform encrypts an account number (e.g., a PAN) using a public key assigned to the merchant, and the merchant computer system decrypts the account number using a private key corresponding to the public key. For example, the private key and the public key may be assigned to the merchant by the interchange network for use in signing documents and/or messages, and may also be used for encrypting messages transmitted between the merchant and the interchange network.

While the invention has been described in terms of various specific embodiments, those skilled in the art recognizes that the invention can be practiced with modification within the spirit and scope of the claims.

Exemplary embodiments of methods, systems, and computer-readable storage media for use in implementing a financial transaction processing system are described above in detail. The methods, systems, and storage media are not limited to the specific embodiments described herein but, rather, operations of the methods and/or components of the system may be utilized independently and separately from other operations and/or components described herein. Further, the described operations and/or components may also be defined in, or used in combination with, other systems, methods, and/or storage media, and are not limited to practice with only the methods, systems, and storage media as described herein.

A computing device, such as those described herein, includes at least one processor or processing unit and a system memory. The computing device typically has at least some form of computer readable media. By way of example and not limitation, computer readable media include computer storage media and communication media. Computer storage media include volatile and nonvolatile, removable and non-removable physical media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The methods described herein may be encoded as executable instructions embodied in a computer readable medium, including, without limitation, a computer storage medium, a storage device, and/or a memory device. Such instructions, when executed by a processor, cause the processor to perform at least a portion of the methods described herein.

Although the present invention is described in connection with an exemplary financial transaction processing system environment, embodiments of the invention are operational with numerous other general purpose or special purpose financial transaction processing system environments or configurations. The financial transaction processing system environment is not intended to suggest any limitation as to the scope of use or functionality of any aspect of the invention. Moreover, the financial transaction processing system environment should not be interpreted as having any dependency or requirement relating to any one or combination of components illustrated in the exemplary operating environment. Examples of well known financial transaction processing systems, environments, and/or configurations that may be suitable for use with the embodiments described herein include, but are not limited to, embedded computing devices, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program components or modules, executed by one or more computers, processors, and/or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal languages of the claims.

What is claimed is:

1. A method for performing a financial transaction using an interchange computer coupled to a database, the interchange computer and database associated with an interchange network, the transaction initiated by a cardholder with a merchant having a merchant device, said method comprising:
storing cardholder data within the database including transaction card data and associated address data for the cardholder, the cardholder data inputted on behalf of the cardholder for registering with an express checkout service provided by the interchange network;
receiving, at the interchange computer, a payer authentication request message from the merchant device, the payer authentication request message associated with the cardholder and including data representing at least one of transaction card brands supported for payment by the merchant, a response time limit, and item purchase information, wherein the payer authentication request message does not include transaction card data associated with the cardholder;
prompting the cardholder to enter access credential information;
verifying the entered access credential information at the interchange computer;
prompting, by the interchange computer, the cardholder to select a transaction card from one or more transaction cards associated with the cardholder based at least in part on the payer authentication request message and the entered access credential information;
retrieving cardholder data from the database associated with the cardholder including transaction card data for the selected transaction card and associated address data; and
transmitting a payer authentication response message from the interchange computer to the merchant device, the payer authentication response message including the retrieved transaction card data and associated address data,
wherein the merchant device is configured to extract the transaction card data and the associated address data from the payer authentication response message for use in populating a merchant payment form to complete the transaction as part of the express checkout service.

2. The method of claim 1, further comprising:
receiving a verify enrollment request message from the merchant at the interchange computer, the verify enrollment request message including at least one of a final transaction amount, an authorization response code, and a promotion code associated with the financial transaction; and
associating the final transaction amount with the cardholder at the interchange computer.

3. The method of claim 2, further comprising transmitting a negative verify enrollment response message from the interchange computer system to the merchant in response to the verify enrollment request message.

4. The method of claim 1, wherein receiving the payer authentication request message comprises receiving the payer authentication request message including at least one protocol extension, wherein the at least one protocol extension includes data representing transaction card brands supported for payment, a response time limit, and item purchase information.

5. The method of claim 1, further comprising:
prompting the cardholder to select a shipping address from one or more shipping addresses associated with the cardholder; and
transmitting the selected shipping address within the payer authentication response message.

6. The method of claim 1, wherein transmitting a payer authentication response message comprises transmitting the payer authentication response message including at least one of a primary account number, an expiry date, and a security code.

7. The method of claim 1, further comprising encrypting the transaction card data using a public key assigned to the merchant by the interchange network.

8. The method of claim 1, wherein the payer authentication request message includes data representing transaction card brands supported for payment by the merchant, and prompting the cardholder to select a transaction card comprises prompting the cardholder to select a transaction card from one or more transaction cards associated with the cardholder that is a card brand included within the payer authentication request message.

9. The method of claim 1, wherein the payer authentication request message includes item purchase information, said method further comprising associating the item purchase information with the cardholder at the interchange computer.

10. The method of claim 1, wherein transmitting a payer authentication response message comprises transmitting a positive payer authentication response message indicating that the merchant is approved to transmit an authorization request for the financial transaction.

11. A system for performing a financial transaction, said system comprising:
a database configured to store cardholder data including transaction card data and associated address data for a plurality of transaction cards associated with a cardholder, the cardholder data inputted on behalf of the cardholder for registering with an express checkout service; and
an interchange computer configured to:
receive a payer authentication request message from a merchant device, the payer authentication request message associated with the cardholder and including data representing at least one of transaction card brands supported for payment by a merchant associated with the merchant device, a response time limit, and item purchase information;
prompt the cardholder to enter access credential information;
verify the entered access credential information;
prompt the cardholder to select a transaction card from the plurality of transaction cards associated with the cardholder stored in said database based at least in part on the payer authentication request message and the entered access credential information;
retrieve cardholder data from the database associated with the cardholder including transaction card data for the selected transaction card and associated address data and
transmit a payer authentication response message to the merchant device, the payer authentication response message including the retrieved transaction card data and associated address data,
wherein the merchant device is configured to extract the transaction card data and the associated address data from the payer authentication response message for use in populating a merchant payment form to complete the transaction as part of the express checkout service.

12. The system of claim 11, wherein said interchange computer is further configured to:
receive a verify enrollment request message from the merchant after transmitting the payer authentication response message, wherein the verify enrollment request message is associated with the financial transaction and includes a final transaction amount for the financial transaction; and
store the final transaction amount in the database corresponding to the cardholder.

13. The system of claim 12, wherein the verify enrollment request message further includes a promotion code representing a discount applied to the financial transaction, and said interchange computer is further configured to associate the promotion code with the cardholder in the database.

14. The system of claim 12, wherein said interchange computer is further configured to transmit a negative verify enrollment response message to the merchant based on determining that authentication has been performed previously for the financial transaction.

15. The system of claim 11, wherein the payer authentication request message includes at least one protocol extension, the at least one protocol extension including data representing transaction card brands supported for payment, said interchange computer configured to prompt the cardholder to select a transaction card from one or more transaction cards associated with the cardholder and included within the at least one protocol extension.

16. The system of claim 11, wherein said interchange computer is configured to include within the payer authentication response message at least one of a primary account number, an expiry date, and a security code.

17. The system of claim 11, wherein said database is further configured to store one or more shipping addresses associated with the cardholder, and said interchange computer is further configured to:
prompt the cardholder to select a shipping address from the one or more shipping addresses associated with the cardholder; and
include the selected shipping address within the payer authentication response message.

18. The system of claim 11, wherein said interchange computer is further configured to:
receive a payer authentication request message having at least one protocol extension; and
transmit a payer authentication response message having at least one protocol extension.

19. A computer device for performing a financial transaction, said computer device configured to be coupled in communication with a database for storing cardholder data including transaction card data and corresponding address data associated with a plurality of cardholders, the cardholder data inputted on behalf of each of the plurality of cardholders for registering with an express checkout service, said computer device programmed to:
receive a payer authentication request message from a remote device, the payer authentication request message associated with a first cardholder from the plurality of cardholders and including data representing at least one of transaction card brands supported for payment by a merchant and item purchase information;
prompt first the cardholder to enter access credential information;
verify the entered access credential information by comparing the entered access credential information to data associated with the first cardholder in the database;
prompt the first cardholder to select a transaction card from one or more transaction cards associated with the first cardholder in the database based at least in part on the payer authentication request message and the entered access credential information;
retrieve cardholder data from the database associated with the first cardholder including transaction card data for the selected transaction card and corresponding address data; and
transmit a payer authentication response message to the remote device, the payer authentication response message including the retrieved transaction card data and corresponding address data,
wherein the remote device is configured to extract the transaction card data and the corresponding address data from the payer authentication response message for use in populating a merchant payment form to complete the transaction as part of the express checkout service.

20. The computer device of claim 19, further programmed to:
prompt the first cardholder to select a shipping address from one or more addresses associated with the first cardholder in the database; and
transmit the selected shipping address within the payer authentication response message to the remote device.

21. A computer-readable medium that includes computer executable instructions for performing a financial transaction using a database configured to store cardholder data including transaction card data and address data associated with a plurality of cardholders, cardholder data inputted on behalf of each of the plurality of cardholders for registering with an express checkout service, said computer executable instructions configured to instruct a computer to:
receive a payer authentication request message from a merchant device, the payer authentication request message associated with a first cardholder from the plurality of cardholders and including data representing at least one of transaction card brands supported for payment by a merchant associated with the merchant device, a response time limit, and item purchase information;
prompt the first cardholder to enter access credential information;
verify the entered access credential information;
prompt the first cardholder to select a transaction card from one or more transaction cards associated with the first cardholder in the database based at least in part on the payer authentication request message and the entered access credential information;
retrieve cardholder data from the database associated with the first cardholder including transaction card data for the selected transaction card and address data; and
transmit a payer authentication response message to the merchant device, the payer authentication response message including the retrieved transaction card data and address data,
wherein the merchant device is configured to extract the transaction card data and the address data from the payer authentication response message for use in populating a merchant payment form to complete the transaction as part of the express checkout service.

22. A method for performing an electronic purchase transaction using an interchange computer coupled to a database, the interchange computer and database associated with an interchange network, the transaction initiated by a cardholder with a merchant website associated with a merchant, said method comprising:

storing cardholder data within the database including transaction card data and address data for the cardholder, the cardholder data inputted on behalf of the cardholder for registering with an express checkout service provided by the interchange network;

receiving, at the interchange computer, a payer authentication request message from the merchant website, the payer authentication request message associated with the cardholder and including data representing transaction card brands supported for payment by the merchant;

prompting the cardholder to enter access credential information;

verifying the entered access credential information at the interchange computer;

prompting the cardholder to select a transaction card from one or more transaction cards associated with the cardholder and with a transaction card brand supported for payment based at least in part on the payer authentication request message and the entered access credential information;

retrieving cardholder data from the database associated with the cardholder including transaction card data for the selected transaction card and address data; and transmitting a payer authentication response message from the interchange computer to the merchant website, the payer authentication response message including the retrieved transaction card data and address data, wherein the merchant website is configured to extract the transaction card data and the address data from the payer authentication response message for use in populating a merchant payment form to complete the transaction as part of the express checkout service.

23. The method of claim 22, further comprising:

prior to receiving the payer authentication request message, receiving from the merchant a verify enrollment request message including a static account number associated with the merchant;

determining that the static account number is included in a list of account numbers enrolled in a secure transaction processing program; and transmitting a positive verify enrollment response message from the interchange computer system to the merchant.

* * * * *